United States Patent Office 3,331,019
Patented July 11, 1967

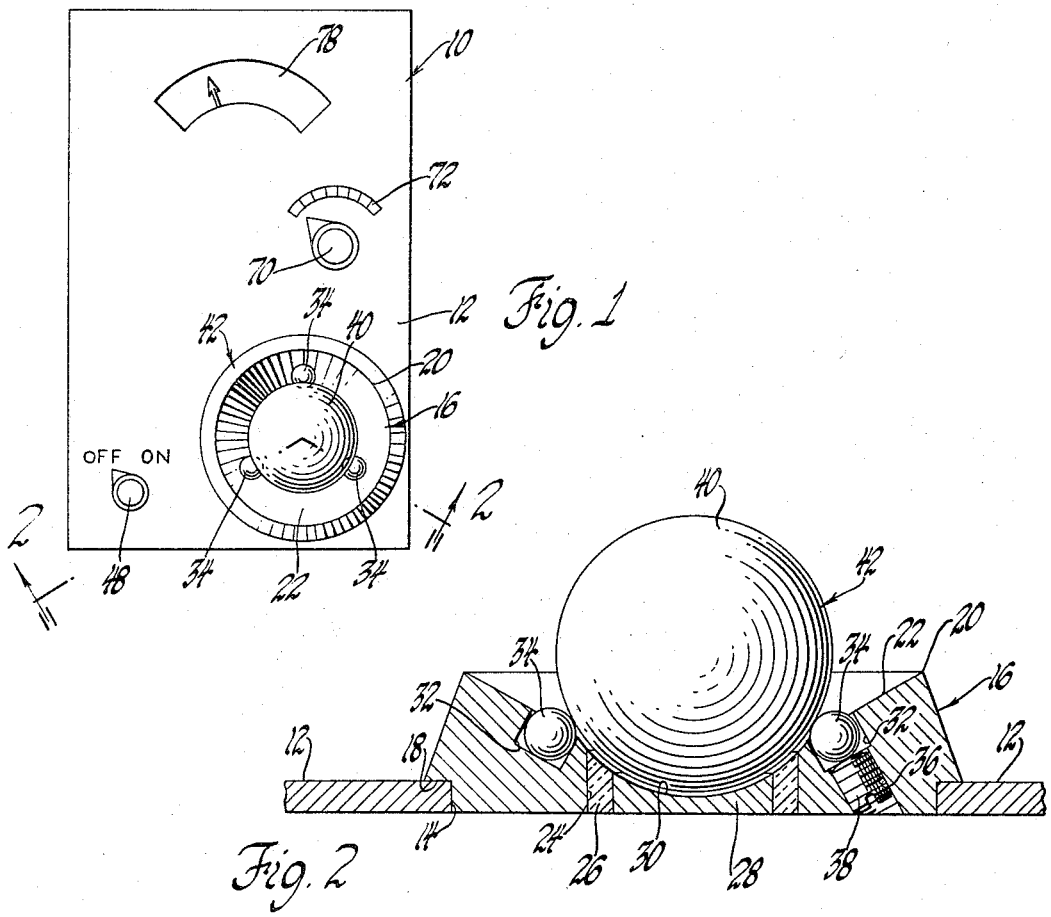
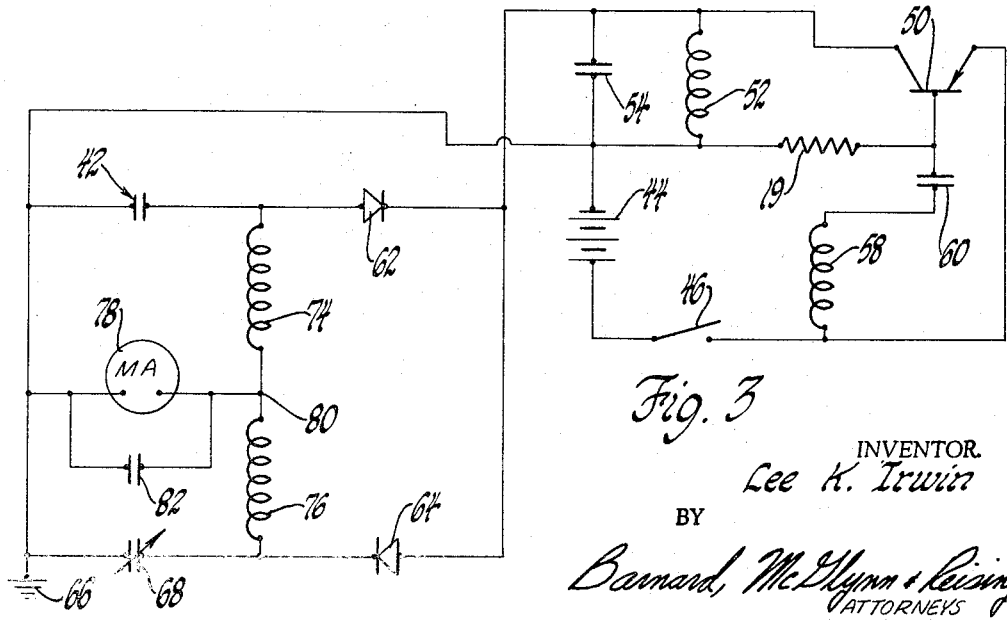

3,331,019
INSTRUMENT FOR TESTING THE CONDITION OF OIL HAVING SPHERICAL BALL SUPPORT MEANS
Lee K. Irwin, Emporia, Kans., assignor to Hopkins Manufacturing Corporation, Inc., Emporia, Kans., a corporation of Kansas
Filed Dec. 17, 1963, Ser. No. 331,215
14 Claims. (Cl. 324—61)

This invention relates to an instrument for testing the condition of a fluid by indicating an electrical property thereof and, in particular, to such an instrument specifically adapted to test for contaminants such as dirt, water, acids, oxidation, varnish and anti-freeze in the lubricating oils of internal combustion engines.

As is well known, of course, lubricating oils are employed with internal combustion engines, such as are used on automotive vehicles, lawnmowers, marine craft, aircraft and the like, for lubricating the moving parts of and, hence, prolonging the life of such engines. As is equally well known, as an engine is operated contaminants such as dirt, water, acids, oxidation, varnish and anti-freeze enter the oil and reduce the lubricating quality of the latter, and eventually resulting in the necessity of completely changing the oil in the interest of protecting the engine. However, it must be noted that the extent of contamination and, hence, the efficiency of the oil in lubricating the moving parts of the engine depends not on one but on several factors such as, for example, the period during which the oil has been contained in the engine block, the hours of operation of the engine, ambient atmospheric conditions in which the engine is operated and certain reactions which can occur between the oil and various contaminants which may be received therein. Thus, due to any one or various combinations of these considerations as well as others, the useful lubricating life of a given change of oil may vary considerably.

Notwithstanding the foregoing considerations, for years it has been the usual practice to change oil in a particular engine at certain predetermined intervals. For example, an automobile manufacturer usually recommends changing the engine oil after so many miles of driving the vehicle. Manufacturers of lawnmowers, air and marine craft to name a few, on the other hand, usually recommend changing oil after so many hours of operation. Obviously, these yardsticks result largely from a rule of thumb, and bear no close relation to the actual period of usefulness of any given change of oil since they do not take into consideration such other factors as the type of use to which the engine is subjected, ambient air conditions and other of the factors aforementioned, and certainly do not reflect any consideration for the interplay between these factors in order to accurately determine when it is time to change oil. As a result, many engines have their oil changed even though the original oil is sufficiently uncontaminated and otherwise retains sufficient lubricating quality as to make such a change unnecessary; in other instances, oils are left in an engine beyond their useful life resulting in damage to the engine itself.

It is, therefore, a principal object and feature of this invention to provide a relatively simple, inexpensive and accurate apparatus for determining the condition of a fluid, and particularly the aggregate extent of contamination of oils utilized for lubricating purposes with internal combustion engines.

Another object of the invention is to provide an instrument which is capable of testing the condition of lubricating oil by use of a sample consisting of only a few drops of the oil, the sample being conveniently obtained by permitting a few drops to drain from the dipstick conventionally associated with an automotive internal combustion engine containing the oil to be tested.

It is yet another object and feature of this invention to provide an instrument for testing the condition of a fluid, and particularly a lubricating oil as aforementioned, by indicating an electrical property thereof, such instrument comprising means including a first electrically conductive member having a spherically concave surface portion forming a receptacle for a sample of fluid to be tested, a second electrically conductive member having a spherically convex surface portion, support means for engaging spaced portions of said surface portion of said second electrically conductive member to support the latter opposite and spaced from the surface portion of the aforementioned first electrically conductive member to form an electrical cell for retaining a sample of fluid therebetween, and electrical circuit means including the first and second members aforementioned for indicating an electrical parameter dependent upon the electrical characteristics of such sample of fluid.

More specifically, the objects and features of the present invention include the provision of an instrument for testing the condition of lubricating oil by indicating an electrical property thereof comprising means including a first electrically conductive member defining a receptacle for a sample of oil to be tested, such member including a spherically concave surface portion, a second electrically conductive member having a spherically convex surface portion, a plurality of support means mounted within the receptacle to engage spaced portions of the spherically convex surface portion of the second member to support the latter in a predetermined position opposite and slightly spaced from the spherically concave surface portion of the first member to form an electrical cell for retaining a predetermined sample of oil therebetween, and electrical circuit means including the first and second members aforementioned for indicating an electrical parameter dependent upon the electrical characteristics of such sample of oil.

In this regard, it is yet a more specific object and feature of this invention to provide an instrument of the type aforementioned in which the second electrically conductive member takes the form of a spherical test ball while the aforementioned plurality of support means are likewise spherical balls to provide a three point suspension for the test ball opposite the spherically concave surface portion of the first electrically conductive member aforementioned.

It is yet another object and feature of this invention to provide an instrument of the type aforementioned in which means are provided for adjusting the position of at least one of the support balls for the purpose of adjusting the relative position of the aforementioned test ball relative to the spherically concave surface portion of the first electrically conductive member to vary the capacity of the instrument.

In order to facilitate an understanding of the invention, a preferred embodiment thereof will now be described with reference to the accompanying drawing in which:

FIGURE 1 is a top plan view of an instrument illustrating a preferred embodiment of the invention;

FIGURE 2 is an enlarged fragmentary sectional view taken along line 2—2 of FIGURE 1; and FIGURE 3 is a diagram of an electric circuit which may be utilized in the instrument.

At this juncture, it may be observed that it is well known that the extent of harmful contamination and other qualities of lubricating oil can be ascertained by determining the dielectric property of the oil. Unused lubricating oils of good quality have dielectric constants which are similar, irrespective of their viscosities or the type of detergents or other additives incorporated therein. The accumulation of suspended foreign matter in the oils and the breakdown of their protective film-forming ability alter their dielectric constants. Such characteristic changes in the dielectric constants of a contaminated lubricating oil, as compared to an uncontaiminated oil of good quality, is utilized in the present instrument.

Thus, in its more specific aspects, the invention may be briefly described as including a novel type of capacitor in which one of the plates thereof takes the form of a first electrically conductive member having a spherically concave surface portion forming part of a dished receptacle for a sample of oil to be tested, a second electrically conductive member having a spherically convex surface portion, and a plurality of spaced support means mounted within the receptacle and engageable with the convex surface portion of the second member to hold the respective members in a predetermined position opposite and slightly spaced from each other, whereby the respective members thus cooperate to provide a capacitor in which the sample of oil to be tested confined therebetween is the dielectric. An electrical circuit is provided for indicating the capacitance of this capacitor and, hence, the dielectric constant of the oil sample being tested which, in turn, indicates its lubricating quality.

More specifically, the instrument indicated generally at 10 comprises a housing for the various components thereof and including the top wall 12 having a circular opening 14 therein. A circular metal ring 16 includes a continuous outer peripheral shoulder 18 seated on the top wall 12 and within the opening 14, a continuous circular rim 20 and circular dished surface 22 sloping downwardly therefrom at approximately a 30° angle from the horizontal toward a circular opening 24 in such ring. An annular ring 26 of suitable dielectric material, such as glass, nylon, styrene or the like, is suitably secured within the opening 24, and a metallic insert 28 is, in turn, suitably secured within such ring of dielectric material. The upper surface 30 of the insert 28, as well as the upper end of the ring of dielectric material, are spherically concave and complementary as illustrated particularly in FIGURE 2, and coact with the sloping surface 22 of the ring 16 to form a well or receptacle to receive a few drops of a sample of oil as will be described hereinafter.

As will be readily apparent, the sloping surface 22 of the ring 16 is provided with a plurality of cylindrical seating pockets 32, in this case three in number, equidistantly spaced about the vertical axis of the aforementioned receptacle, and a spherical support ball 34 having a spherically convex outer surface is mountable within each of these support pockets so as to extend above the sloping surface 22. The base of at least one of the pockets, as illustrated in FIGURE 2, communicates with a threaded bore 36 axially threadably adjustably receiving the threaded set screw 38 or the like which engage and form a seat for the support ball 34 associated therewith. Thus, the position of the one support ball may be adjusted by adjusting the set screw 38 and result, therefore, in adjustment of a three-point suspension formed by the respective support balls 34 in supporting the spherical test ball 40 having a spherically convex outer surface. With the aforedescribed test ball 40 supported on balls 34 opposite insert 28 as illustrated, test ball 40 and insert form the plates of a capacitor indicated generally at 42 in FIGURES 1 and 2 and in the circuit diagram of FIGURE 3.

The electric circuit includes a battery 44 which is connected in a feed-back oscillator circuit by means of a switch 46 controlled by a knob 48 as illustrated in FIGURE 1. The battery 44 biases the base of a transistor 50 which is connected as a common emitter current and voltage amplifier. A coil 52 and a capacitor 54 form a parallel tuned circuit which is resonant at a radio frequency which may be in the order of 4.5 megacycles. A resistor 19 biases the base of the transistor 50. A coil 58 is inductively coupled to the coil 52 and its output is fed to the base of the transistor 50 through a capacitor 60.

The oscillator circuit described above is more or less conventional. One terminal of its output is fed to diodes 62 and 64 which are oppositely connected, as illustrated. The other output terminal of the oscillator is grounded at 66. The capacitor 42 has one of its plates 40 connected to ground at 66 and its other plate 28 connected to the diode 62. An adjustable capacitor 68 is provided with the control knob 70, as illustrated in FIGURE 1, associated with a suitably calibrated dial 72. The adjustable capacitor 68 is connected to the diode 64 and to ground. Radio frequency choke coils 74 and 76 are connected between diodes 62 and 64. A microampere meter 78 is connected to ground and to terminal 80 between choke coils 74 and 76. The meter 78 is shunted by a capacitor 82 which is sufficiently large to prevent the meter from responding to individual half cycles of the applied current, and causes the meter to average out the entire cycle of the applied current. The capacitor 82 also shunts the meter coil to insure that the meter movement will not be resonant at the applied frequency. The capacitor 82 may be eliminated if the meter 78 has a sufficiently long time constant. The needle of the meter 78 will deflect in one direction or the other depending on which of the half cycles of applied current is the larger.

The diode 64 is conductive on the positive half of the cycle of the output of the oscillator circuit and charges the capacitor 68. Choke coil 76 conducts current to the terminal 80 and the meter 78 which tends to deflect the meter needle in one direction. The diode 62 is conductive on the negative half of the cycle and charges the capacitor 42. In this half cycle, choke coil 74 conducts current to the terminal 80 and to the meter 78 which tends to deflect the meter needle in the opposite direction. However, when the bridge is balanced by proper adjustment of the capacitor 68, the current from diode 62 and capacitor 42 are equal and opposite to the current from diode 64 and capacitor 68 and the average potential at terminal 80 is zero so no current actually flows through the meter 78. When the bridge is unbalanced, the choke coils 74 and 76 and the capacitor 82 function to smooth out the pulses and cause smooth flow of current through the meter 78.

The calibration of the instrument may be checked by placing a sample of new oil of known quantity in the capacitor 42 and adjusting the capacitor 68 until the meter 78 indicates no flow of current therethrough. This adjustment of the capacitor 68 should result in a "good" reading on the dial 72. Oil which has been contaminated through use will have a different dielectric constant and, when such oil is tested, a different adjustment of the capacitor 68 will be required to avoid flow of current through the meter 78. The reading on the dial 72 will be "poor" or "bad," depending on the extent to which the dielectric strength of the lubricating oil has changed.

The novel form of the capacitor 42 illustrated in FIGURE 2 utilizes as its dielectric films of oil of uniform thickness so that the only variable is the dielectric constant of the oil. The aforedescribed bridge circuit is highly sensitive to minor variations in the dielectric constant of the oil being tested.

In operation, a few drops of oil may be placed in the receptacle defined by ring 16, dielectric ring 26 and insert 28 as, for example, by momentarily placing one end of a conventional dipstick therein to permit such oil to drain therefrom. The spherical test ball 40 may then be seated on the support balls 34 which cooperate to provide a three-point suspension very accurately positioning the test ball a predetermined slight distance opposite from the spherically concave surface 30 of the insert 28. In so seating the test ball, excess oil quite easily and readily is squeezed from the receptacle toward the rim 20 of the ring 16 between adjacent support balls 34, thereby facilitating seating of the test ball and minimizing the possibility of any foreign particulate material or other matter from being interposed the contact area between the test ball 40 and any one of the support balls 34.

After the test ball 40 is located in the position illustrated in FIGURES 1 and 2, a film of oil will be formed between the insert 28 and the test ball. This film of oil forms the dielectric of a capacitor 42 in which the adjacent surfaces of the test ball and insert form the plates as aforementioned. The test ball is accurately located and positioned relative to the concave surface 30 of insert 28, and there is thus formed an oil film of predetermined thickness. The only variable in the capacitance of this capacitor thus formed will be the dielectric property of the oil being tested, which property is measured by the circuit aforedescribed.

In addition, as the test ball is seated as aforedescribed the sloping surface 22 of the ring 16 causes particles of contamination which are heavier than oil to fall back through the oil between adjacent support balls 34 onto the concave surface 30 of the insert 28. Thus, when such heavier than oil contaminants, such as water or water products such as glycol are contained within the oil being tested, such products will drift back down the surface of the ring 16 and onto the surface 30 of insert 28 and the reading on the meter 78 will not be stable and will move to indicate an increase of such contaminant as more and more drifts in. Finally, the set screw 38 may be readily adjusted to adjust the position of one of the support balls 34 and, hence, the capacity of the receptacle.

While but one form of the invention has been shown and described, other forms will now be apparent to those acquainted with this art. Therefore, it will be understood that the embodiment shown and described is merely for illustrative purposes, and is not intended to limit the scope of the invention which is defined by the claims which follow:

I claim:

1. An instrument for testing the condition of a fluid by indicating an electrical property thereof comprising means including a first electrically conductive member defining a receptacle for a sample of fluid to be tested, said member including a spherically concave surface portion, a second electrically conductive member having a spherically convex surface portion, a plurality of separate support means mounted in spaced relation within said receptacle to engage spaced portions of said spherically convex surface portion of said second member to support the latter opposite and spaced from said spherically concave surface portion of said first member to form an electrical cell for retaining a sample of fluid therebetween, and electrical circuit means including said first and second members for indicating an electrical parameter dependent upon the electrical characteristics of such a sample of fluid.

2. The instrument as defined in claim 1 wherein said support means each comprise a spherically convex support surface engageable with said spherically convex surface portion of said second member.

3. The instrument as defined in claim 1 further comprising a plurality of spaced pockets mounted within said receptacle, said support means each comprising a spherical ball seated within and projecting from said respective pockets.

4. The instrument as defined in claim 1 further comprising a plurality of spaced pockets mounted within said receptacle, said support means each comprising a spherical ball seated within and projecting from said respective pockets, and means for adjusting the position of at least one of said balls relative to its pocket.

5. The instrument as defined in claim 4 wherein said last-named means comprises a bore communicating with the base of at least one of said pockets, and an adjusting member movable within said bore for adjustment relative to the base of said one pocket and against which the associated ball rests.

6. The instrument as defined in claim 1 wherein said support means are spherical balls, and further comprising means mounting said balls in spaced relation within said receptacle.

7. The instrument as defined in claim 1 wherein said support means are spherical balls, and further comprising means mounting said balls in spaced relation within said receptacle below the rim of the latter, said last-named means for at least one of said balls being adjustable.

8. An instrument for testing the condition of a fluid by indicating an electrical property thereof comprising means including a first electrically conductive member having a spherically concave surface portion defining a receptacle for a sample of fluid to be tested, said receptacle including an annular rim surrounding said spherically concave surface portion of said first member, a second electrically conductive member having a spherically convex surface portion, a plurality of separate support means mounted in spaced relation within said receptacle below said rim thereof to engage spaced portions of said spherically convex surface portion of said second member to support the latter in a predetermined position opposite and slightly spaced from said spherically concave surface portion of said first member to form an electrical cell for retaining a predetermined sample of fluid therebetween, and electrical circuit means including said first and second members for indicating an electrical parameter dependent upon the electrical characteristics of such a sample of fluid.

9. An instrument for testing the condition of a fluid by indicating an electrical property thereof comprising means including a first electrically conductive member having a spherically concave surface portion defining a receptacle for a sample of fluid to be tested, said receptacle including an annular rim surrounding and radially outwardly spaced from said spherically concave surface portion of said first member, a second electrically conductive member having a spherically convex surface portion, at least three separate support means mounted in spaced relation within said receptacle below said rim thereof and substantially equidistantly spaced from the center thereof to engage spaced portions of said spherically convex surface portion of said second member to support the latter in a predetermined position opposite and slightly spaced from said spherically concave surface portion of said first member to form an electrical cell for retaining a predetermined sample of fluid therebetween, and electrical circuit means including said first and second members for indicating an electrical parameter dependent upon the electrical characteristics of such a sample of fluid.

10. An instrument for testing the condition of an oil by indicating its dielectric strength comprising an electrically conductive support having an opening therein, a dielectric material secured to the walls of said opening, and electrically conductive insert supported within said dielectric material and having a spherically concave surface portion forming a receptacle for a sample of oil to be tested, an electrically conductive member having a spherically convex surface portion, a plurality of separate support means mounted in spaced relation on said support about said dielectric material to engage spaced portions of said spherically convex surface portion of said member to support the latter in a predetermined position opposite and slightly spaced from said spherically concave surface portion of said insert, said spherically concave surface portion of said insert and said spherically convex surface portion of said member forming the plates of a capacitor in which a film of the oil sample is the dielectric, and electrical circuit means including said insert and said member for indicating the capacity of said capacitor.

11. The instrument as defined in claim 10 further comprising a plurality of spaced pockets mounted within said support and substantially equidistantly spaced from the center of said spherically concave surface portion of said insert, said support means each comprising a spherical ball seated within and projecting from said respective pockets, and means for adjusting the position of at least one of said balls relative to its associated pocket.

12. The instrument as defined in claim 11 wherein said last-named means comprises a threaded bore communicating with the base of at least one of said pockets, and a threaded set screw threadably received within said bore for adjustment relative to the base of said one pocket and against which the associated ball rests.

13. The instrument as defined in claim 10 wherein said support and said dielectric material each include surface portions coacting with said spherically concave surface portion of said insert to form an annular extension of said receptacle.

14. The instrument as defined in claim 10 wherein said support and said dielectric material each include surface portions coacting with said spherically concave surface portion of said insert to form an annular extension of said receptacle, and wherein said support means each comprise a spherical ball projecting above said surface portion of said support.

References Cited

UNITED STATES PATENTS

| | | | |
|---|---|---|---|
| 528,791 | 11/1894 | Offerle | 308—6 |
| 1,370,746 | 3/1921 | Hohenstatt et al. | 308—6 |
| 2,337,414 | 12/1943 | Rieber | 324—65 |
| 2,785,474 | 3/1957 | Mages et al. | 33—178 |
| 3,182,255 | 5/1965 | Hopkins et al. | 324—61 |
| 3,207,979 | 9/1965 | Perkins | 324—61 |

WALTER L. CARLSON, *Primary Examiner.*

W. H. BUCKLER, E. E. KUBASIEWICZ,
*Assistant Examiners.*